United States Patent
Santamaria

(10) Patent No.: US 10,727,774 B2
(45) Date of Patent: Jul. 28, 2020

(54) MULTI-LEVEL HIGH-SPEED ADJUSTABLE SPEED DRIVE

(71) Applicant: General Atomics, San Diego, CA (US)

(72) Inventor: George Thomas Santamaria, Encinitas, CA (US)

(73) Assignee: General Atomics, San Diego, CA (US)

( * ) Notice: Subject to any disclaimer, the term of this patent is extended or adjusted under 35 U.S.C. 154(b) by 458 days.

(21) Appl. No.: 15/067,448

(22) Filed: Mar. 11, 2016

(65) Prior Publication Data

US 2017/0264226 A1 Sep. 14, 2017

(51) Int. Cl.
*H02P 27/04* (2016.01)
*H02P 13/06* (2006.01)
(Continued)

(52) U.S. Cl.
CPC .............. *H02P 25/22* (2013.01); *H02M 1/12* (2013.01); *H02P 27/14* (2013.01); *H02P 29/50* (2016.02)

(58) Field of Classification Search
CPC ................ H02J 3/32; H02M 1/12; H02P 6/28
See application file for complete search history.

(56) References Cited

U.S. PATENT DOCUMENTS

| | | | |
|---|---|---|---|
| 5,337,227 A | 8/1994 | Stacey | |
| 5,446,642 A | 8/1995 | McMurray | |

(Continued)

FOREIGN PATENT DOCUMENTS

| | | |
|---|---|---|
| CN | 104904106 | 9/2015 |
| EP | 2650999 | 10/2013 |

(Continued)

OTHER PUBLICATIONS

Caballero et al; "Symmetrical Hybrid Multilevel Inverter With 'N' Cells Connected in Parallel Employing Multi-Stage Switching"; Pontificia Universidad Catolica de Valparaiso School of Electrical Engineering, Valparaiso, Chile; Federal University of Santa Catarina Department of Electrical Engineering, Florianopolis, Brazil; 2011; 6 pages.

(Continued)

*Primary Examiner* — Jorge L Carrasquillo
*Assistant Examiner* — Charles S Laughlin
(74) *Attorney, Agent, or Firm* — Fitch, Even, Tabin & Flannery LLP

(57) ABSTRACT

A multi-level high-speed adjustable speed drive has a plurality of modular multilevel, 3-phase inverter bridges, wherein the multilevel, 3-phase inverter bridges operate with fundamental frequency, f, wherein the multilevel, 3-phase inverter bridges include at least three levels, wherein the multilevel, 3-phase inverter bridges operate in Pulse-Width Modulation (PWM) mode with 9 to 21× or operating in Fundamental Frequency Mode (FFM), wherein inverter commutation frequency equals the fundamental frequency, wherein the multilevel, 3-phase inverters operate with split phase such that one group is displaced from the other by an angle, $\theta=60°/q$, wherein the phase displacement of a harmonic component of order n between groups, $\theta_n$ is $n\theta/q$; a high-speed polyphase motor with phases arranged in q 3-phase groups; and electromagnetic means for blocking selected groups of harmonics while passing components at fundamental frequency, f, wherein the electromagnetic means includes coils carrying motor current linked by a magnetic core, wherein the electromagnetic means is interposed between the plurality of modular multilevel, 3-phase inverter bridges and the high-speed polyphase motor.

17 Claims, 7 Drawing Sheets

Block Diagram of the invention.

(51) Int. Cl.
*H02M 1/42* (2007.01)
*H02P 25/22* (2006.01)
*H02P 27/14* (2006.01)
*H02P 29/50* (2016.01)
*H02M 1/12* (2006.01)

(56) References Cited

U.S. PATENT DOCUMENTS

| | | | |
|---|---|---|---|
| 5,515,264 | A | 5/1996 | Stacey |
| 5,574,631 | A | 11/1996 | Nelson |
| 5,625,545 | A | 4/1997 | Hammond |
| 5,933,339 | A | 8/1999 | Duba |
| 6,008,633 | A | 12/1999 | Schettler |
| 6,025,701 | A | 2/2000 | Weinhold |
| 6,340,851 | B1 * | 1/2002 | Rinaldi .......... H01F 38/16 307/82 |
| 6,384,567 | B1 | 5/2002 | Maeda |
| 8,564,238 | B2 | 10/2013 | Meynard |
| 2004/0075406 | A1 | 4/2004 | Nakai |
| 2006/0043922 | A1 | 3/2006 | Baker |
| 2007/0290670 | A1 * | 12/2007 | Lee ............... H01F 30/12 323/361 |
| 2008/0010362 | A1 | 1/2008 | Zhou |
| 2009/0045782 | A1 * | 2/2009 | Datta ............. H02M 7/487 322/17 |
| 2012/0218795 | A1 | 8/2012 | Mihalache |
| 2013/0301327 | A1 | 11/2013 | Wagoner |
| 2014/0265587 | A1 | 9/2014 | Garces |
| 2017/0250621 | A1 * | 8/2017 | Townsend ........ H02M 7/487 |

FOREIGN PATENT DOCUMENTS

| | | |
|---|---|---|
| KR | 1020150140741 | 12/2015 |
| KR | 1020160011862 | 2/2016 |
| RU | 2411628 | 2/2011 |
| RU | 2559804 | 7/2015 |

OTHER PUBLICATIONS

Du et al; "Fundamental Frequency Switching Strategies of a Seven-Level Hybrid Cascaded H-Bridge Multilevel Inverter"; Boise State University ScholarWorks; IEEE Transactions on Power Electronics, vol. 24, No. 1; Jan. 1, 2009; pp. 25-33.

Lui; "Design and Application of Hybrid Multilevel Inverter for Voltage Boost"; PhD diss., University of Tennessee; 2009, 102 pages.

Ozdemir, et al.; "Fundamental Frequency Modulated Multilevel Inverter for Three-Phase Stand-Alone Photovoltaic Application"; IEEE; 2008; 6 pages.

International Search Report and Written Opinion of the International Searching Authority for PCT Application No. PCT/US2016/053739 dated Jan. 10, 2017.

Extended European Search Report for EP Application No. 16893787.8 dated Oct. 10, 2019.

Office Action for Russian National Patent Application No. 2018135629 issued by the Russian Patent Office dated Nov. 27, 2019.

* cited by examiner

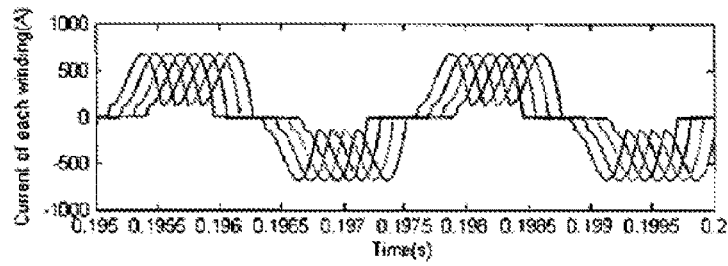
Figure 1. Prior art.
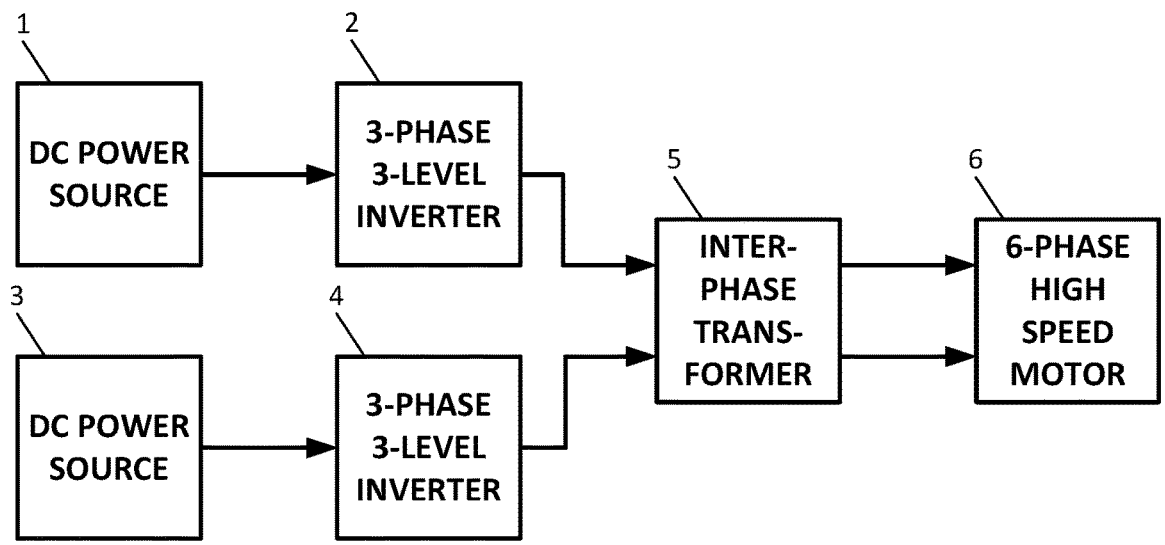
Figure 2. Block Diagram of the invention.

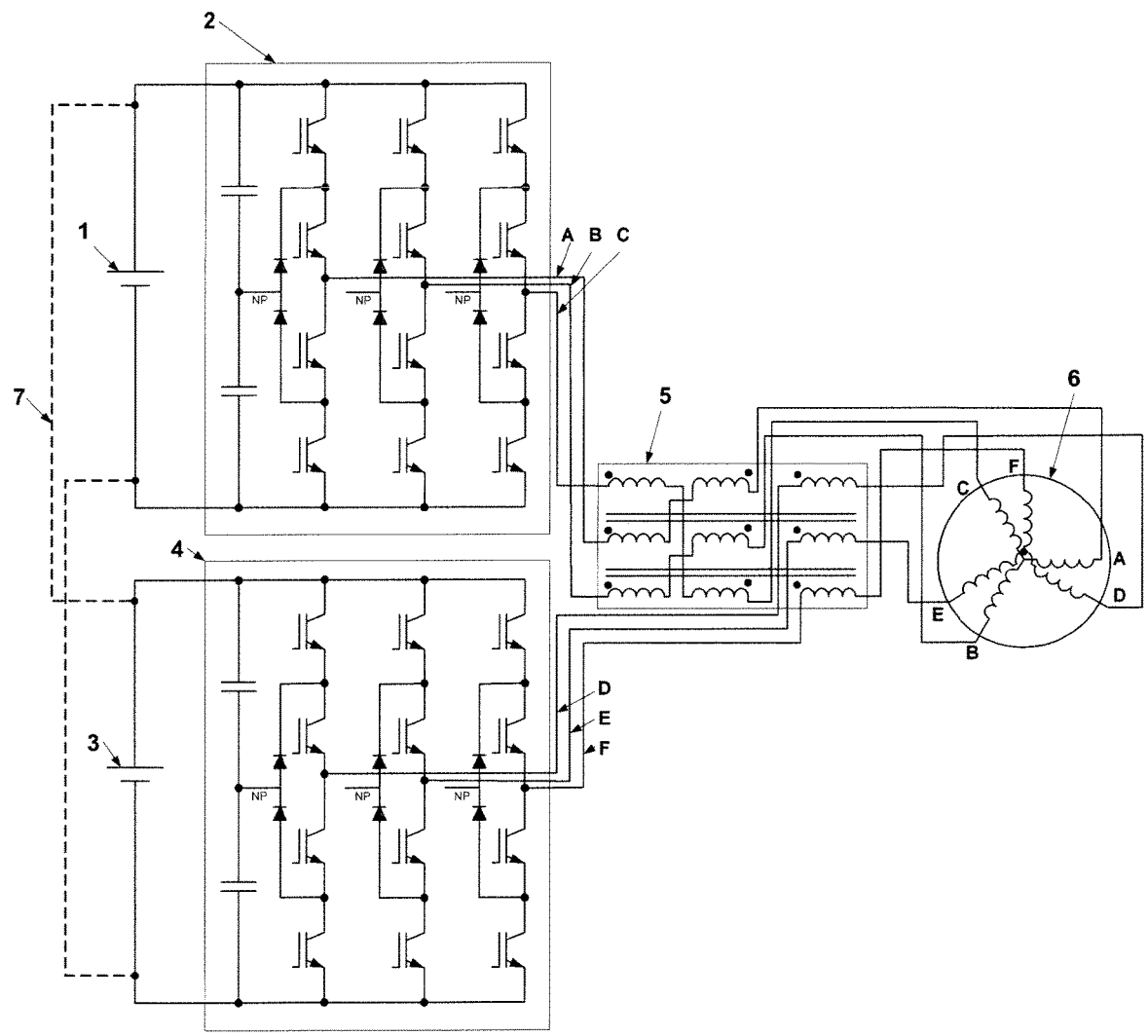
Figure 3. Schematic diagram of the preferred embodiment.

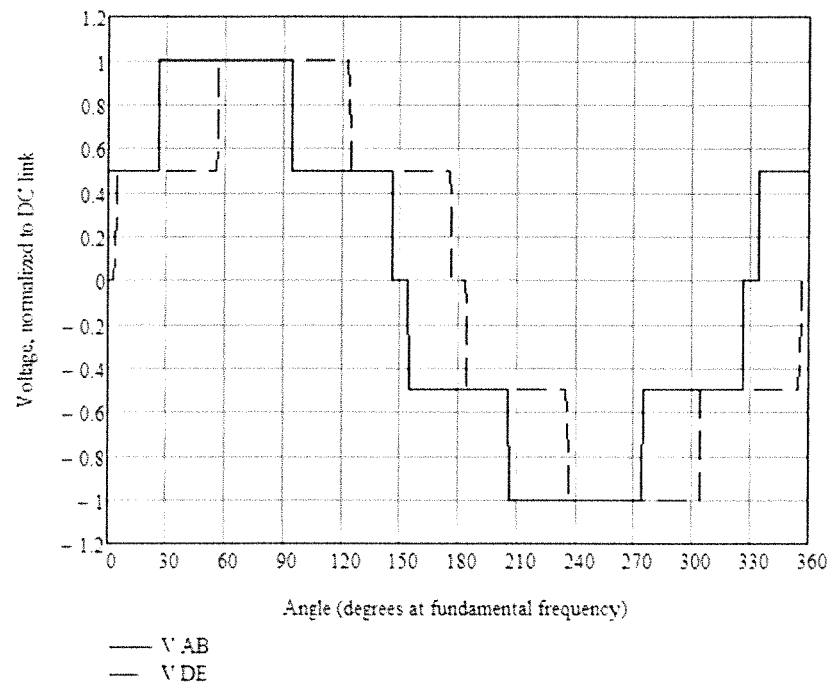
Figure 4. Inverter line-to-line voltages.
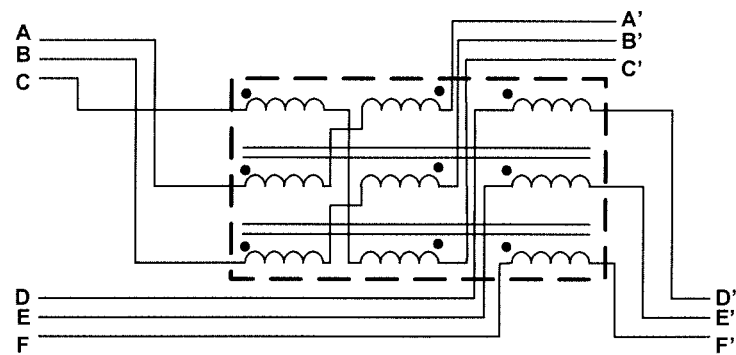
Figure 5. Zig-zag interphase transformer.

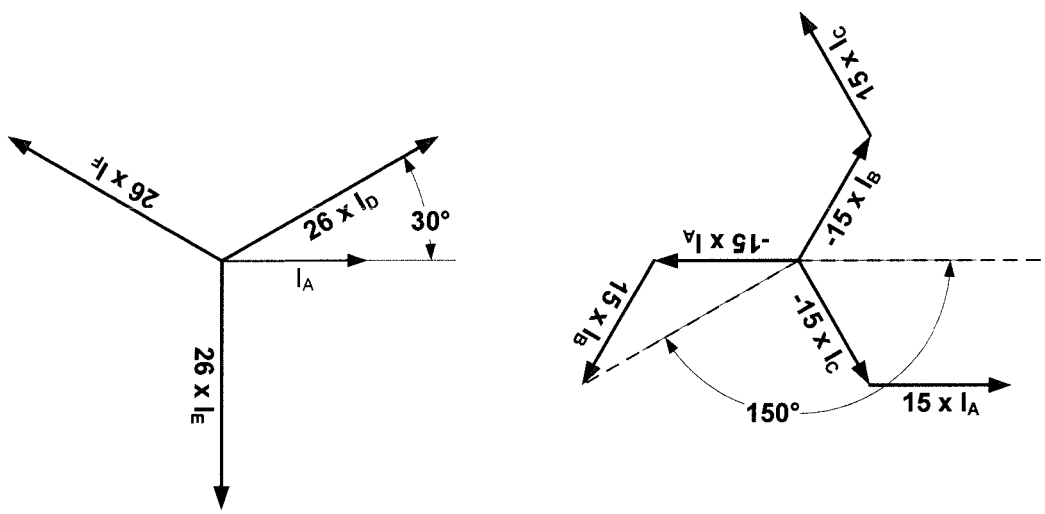
Figure 6.
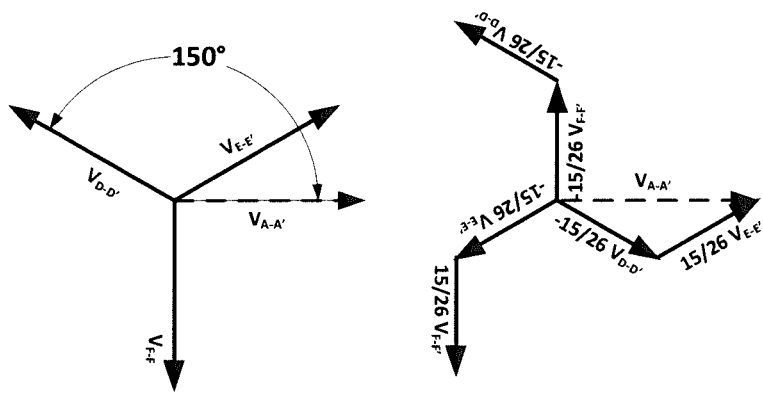
Figure 7. Voltage vectors for $5^{th}$, $17^{th}$..$6k-1$ harmonics.
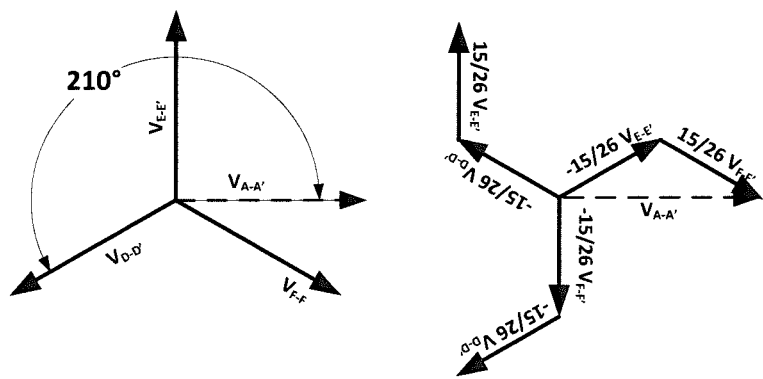
Figure 8 Voltage vectors for $7^{th}$, $19^{th}$...$6k+1$ harmonics.

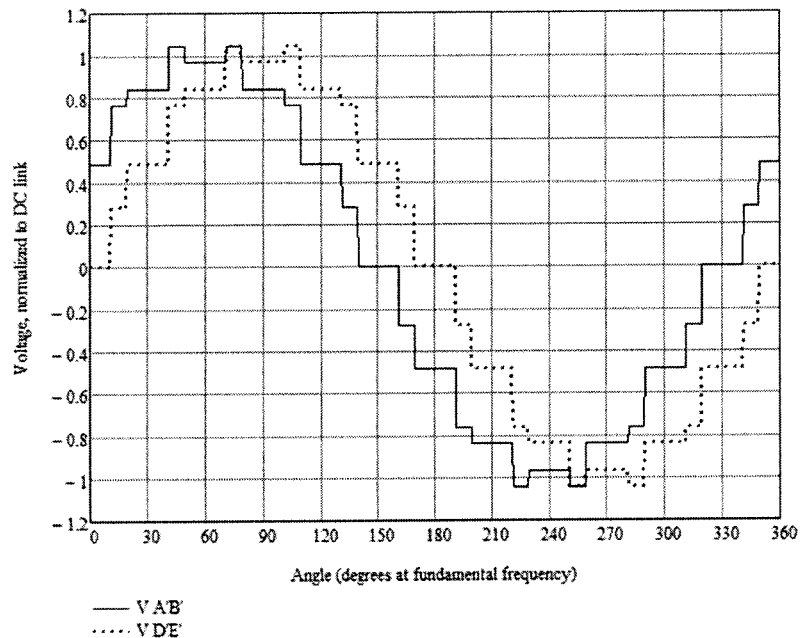
Figure 9, Line-to-line voltages $V_{AB}$ and $V_{DE}$.
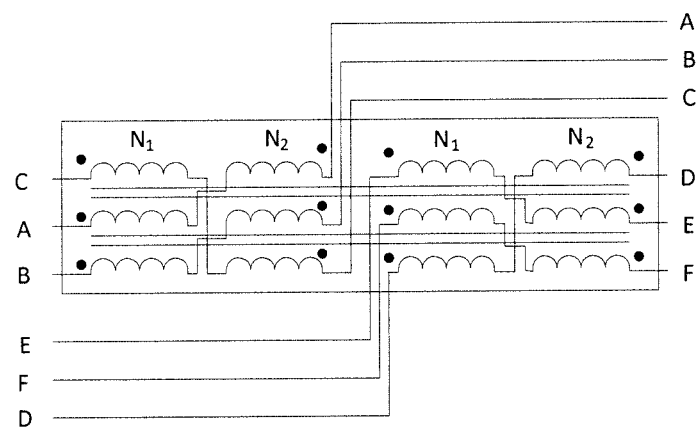
Figure 10. Diagram of alternate version of 5 in Figure 1.

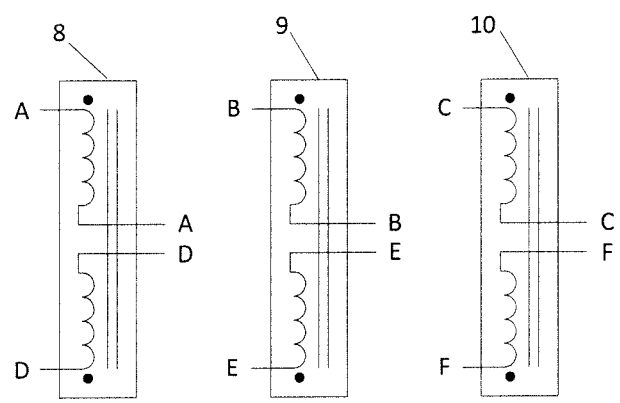
Figure 11. A second alternative of 5 in Figure 2.
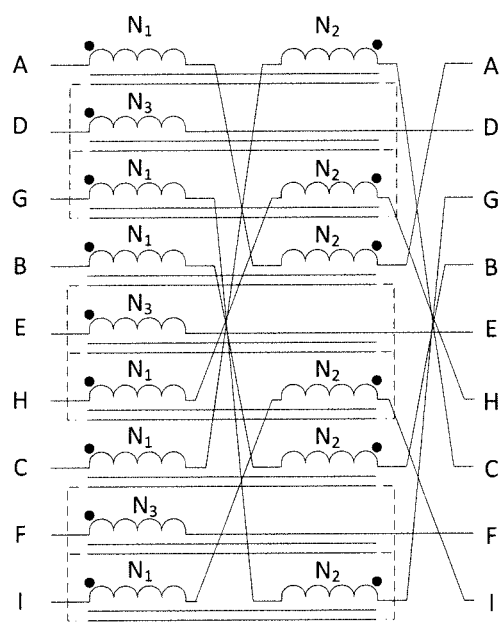
Figure 12. Interphase transformers for a nine-phase system.

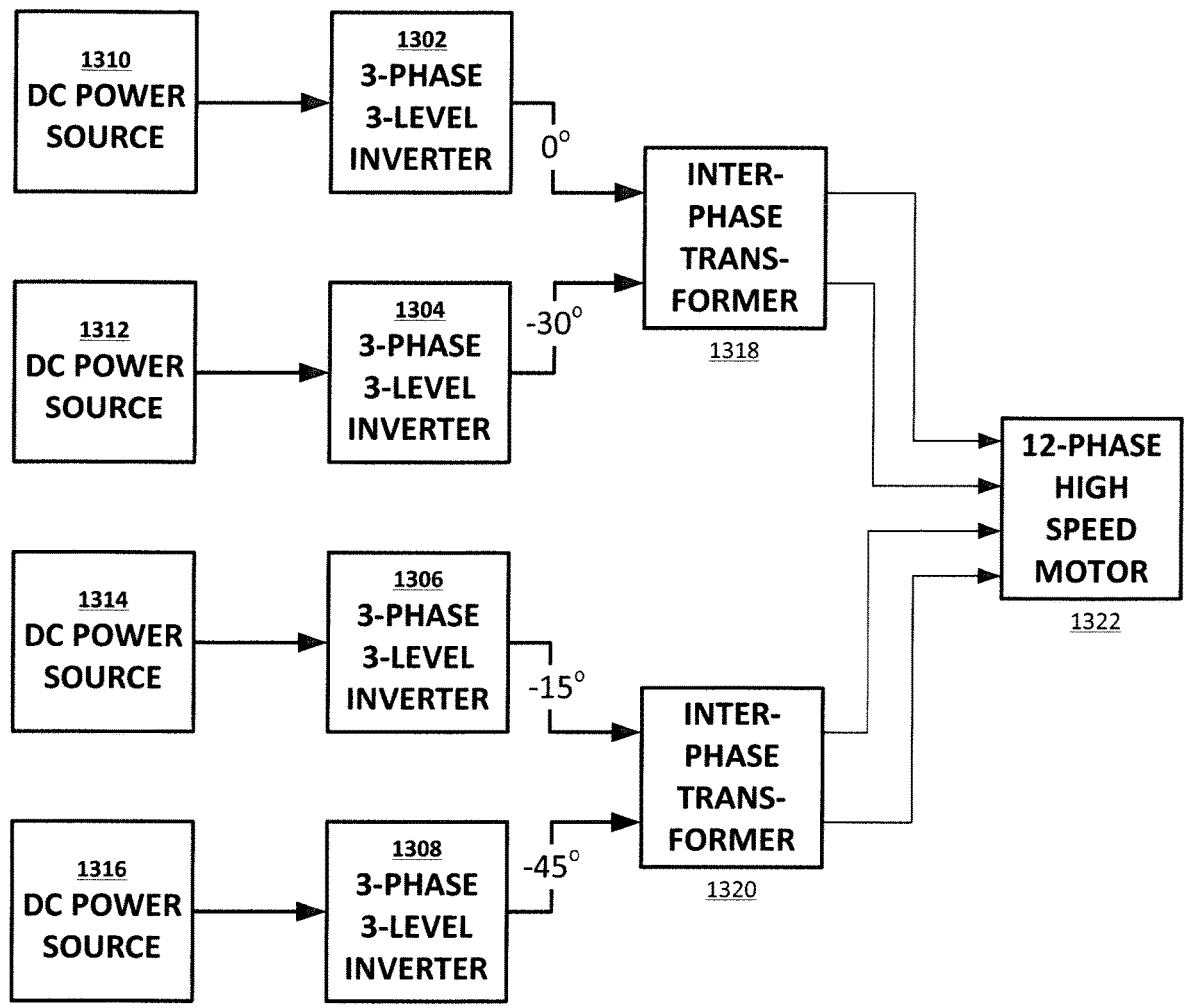
Figure 13. Block diagram of a 12-phase system.

MULTI-LEVEL HIGH-SPEED ADJUSTABLE SPEED DRIVE

BACKGROUND OF THE INVENTION

1. Field of the Invention

The present invention relates generally to adjustable speed drive circuitry and methods, and more specifically to multi-level high speed adjustable speed drive circuitry and methods. Even more specifically, the present invention relates to multi-level high speed adjustable speed drive circuitry and methods for driving high-speed medium-voltage motors.

2. Discussion of the Related Art

Centrifugal compressors for natural gas pipeline and processing applications operate at speeds ranging from 5,000 to 20,000 RPM at power levels from 25 to 2 MW, respectively, with the lower speed associated with higher power levels and vice versa. Typically, when these are compressors electrically driven, the motor is a low speed 50 or 60 Hz motor, 3600 RPM maximum, driving through a speed increasing gearbox to the compressor. More recently, there has been a lot of interest in high speed motors that can drive a gas compressor directly, thereby eliminating the gearbox. In either case, an adjustable speed drive (ASD) is usually required to drive the motor, primarily because the load inertia is high and directly starting across the power supply line is difficult, and, secondly, because the ASD permits, in the case of a compressor driven by a motor, the gas flow to be varied without the energy losses associated with throttling the flow. Most ASD solutions commercially available, particularly large Medium Voltage (MV) (voltages between 2.4 kV and 13.8 kV) ones, are designed to work with lower speed motors operating at no more than 50 or 60 Hz. Thus, the control and switching device technology is tailored to meet the needs of this lower speed market segment. In fact, the normal method of synthesizing a sinusoidal voltage with pulse-width modulation (PWM) encounters limitations with conventional three-phase ASDs when the fundamental frequency exceeds 200 Hz because the PWM usually requires that the semiconductor devices switch at nine or more times the fundamental frequency or 1.8 kHz. The problem is made more difficult when (e.g., >1700 V IGBTs) semiconductors of the type required for MV output are employed as they can be limited to as little as 900 Hz switching frequency. (Note: more recently published vendor data on MV drives will show limitations of 120-200 Hz for fundamental frequency.)

A critical requirement for any ASD of this sort is that the harmonic distortion in the motor be kept to a very low level (<<5% THD). This is because the resistance of motor windings increases with the alternating current (AC) frequency and, in the case of a high speed motor design, avoiding losses by minimizing harmonics is a critical requirement for the combination of motor and inverter. FIG. 1 shows the current waveforms described in this prior art having excessive proportion of 5th and 7th harmonic distortion. It is a key objective to eliminate such harmonics to the extent that such a system can be applied to a high-power, high-speed (>3600 RPM) motor in a practical way.

SUMMARY OF THE INVENTION

Several embodiments of the invention advantageously address the needs above as well as other needs by providing a multi-level high-speed adjustable speed drive.

In accordance with one embodiment, the present invention is a system comprising a plurality of modular multi-level, 3-phase inverter bridges, wherein a plurality of q multilevel, 3-phase inverter bridges operate with fundamental frequency, f, wherein q is an integer ranging from 2 to 5 or any number that may be reduced to practice in the manner described below, wherein the multilevel, 3-phase inverter bridges include at least three levels, wherein the multilevel, 3-phase inverter bridges operate in Pulse-Width Modulation (PWM) mode with modulation frequency of a minimum of 9× fundamental frequency or they operate in Fundamental Frequency Mode (FFM) wherein the inverter commutation frequency in such mode equals the fundamental frequency, wherein q multilevel, 3-phase inverters operate with split phase such that one group is displaced from the other by a phase angle, $\theta=60°/q$, wherein the phase displacement of between groups, $\theta_n$ is $n\theta/q$, with n being the harmonic order; a high-speed polyphase motor with phases arranged in q 3-phase groups; and electromagnetic means for blocking selected groups of harmonics while passing components at fundamental frequency, f, wherein the electromagnetic means includes coils carrying motor current linked by a magnetic core, wherein the electromagnetic means is interposed between the plurality of q modular multilevel, 3-phase inverter bridges and the high-speed polyphase motor.

BRIEF DESCRIPTION OF THE DRAWINGS

The above and other aspects, features and advantages of several embodiments of the present invention will be more apparent from the following more particular description thereof, presented in conjunction with the following drawings.

FIG. 1 is a graph of motor winding current over time showing the effect of adjustable speed drive in this prior art having excessive proportion of 5th and 7th harmonic distortion.

FIG. 2 is a block diagram of a multi-level high-speed adjustable speed drive in accordance with one embodiment of the invention.

FIG. 3 is a schematic diagram of the multi-level high-speed adjustable speed drive of FIG. 2.

FIG. 4 is a graph of line-to-line voltage over one fundamental cycle showing line-to-line voltage under a rated operating condition as generated by the multi-level high-speed adjustable speed drive of FIG. 2.

FIG. 5 is a schematic diagram of a zig-zag configuration of an interphase transformer of the multi-level high-speed adjustable speed drive of FIG. 2.

FIG. 6 is a vector diagram illustrating balanced voltages and assumed currents from each inverter of the multi-level high-voltage adjustable speed drive of FIG. 2.

FIGS. 7 and 8 are phasor diagrams illustrating 5th and 7th harmonic voltages and phase sequences, positive and negative, respectively, generated by a harmonic blocker of the multi-level high-voltage adjustable speed drive of FIG. 2.

FIG. 9 is a graph of motor line-to-line voltages over one fundamental cycle, after the harmonic blocker with the voltage of FIGS. 7 and 8 is applied from an inverter of the multi-level high-voltage adjustable speed drive of FIG. 2.

FIG. 10 is a schematic diagram of an alternative embodiment of the interphase transformer FIG. 5.

FIG. 11 is a schematic diagram of a further alternative embodiment of the interphase transformer of FIG. 5.

FIG. 12 is a schematic diagram of a nine-phase embodiment of the interphase transformer of FIG. 5.

FIG. 13 is a block diagram of a twelve-phase embodiment of the system of FIG. 1.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The present embodiment eliminates the fundamental frequency barrier typical of many Adjustable Speed Drive (ASD) designs by operating the three-level or multi-level inverter in Fundamental Frequency Mode (FFM), a mode wherein a quasi-rectangular variable-voltage wave is produced by the inverter with very high efficiency, typically greater than 99.4%. In FFM, the inverter switches commutate only once per fundamental frequency cycle. This FFM output voltage has a high percentage of 5th, 7th and other harmonics in the output voltage. If this voltage is applied directly to a permanent magnet (PM) motor or to an induction motor, the resulting non-sinusoidal current would cause excessive losses in the motor rotor, degrading efficiency, and, possibly overheating the motor. An additional side effect would be the production of a vibratory torque or torque ripple which, with a frequency coincident with a mechanical resonance, could destroy the motor shaft and/or coupling. It is a key object of this invention to couple the output of an FFM inverter so as to reduce or eliminate the lower order harmonics in the motor and the side effects described above. Doing so facilitates the design of a high voltage, high power inverter without series connections of lower voltage semiconductor switches. Alternatively, the inverter functions without the series connection of the AC outputs of numerous inverter bridges which necessarily require numerous individually isolated DC sources, as is required in the common Cascade H-Bridge (CHB) type of inverter circuit of U.S. Pat. No. 5,625,545.

In fact, with the reduction to practice embodied in this invention, the controller can be made as a six-phase, rather than the more complicated twelve-phase system described in other prior art (e.g., Sabin, et al, US patent No. 2008/010362). This minimizes complexity and increases reliability.

Referring first to FIG. 2, a block diagram is shown of a multi-level high-speed (>3600 RPM) adjustable speed drive in accordance with one embodiment of the invention.

Shown is a first multilevel, 3-phase voltage-fed inverter 2 and a second multilevel 3-phase voltage-fed inverter 4, a first DC power source(s) 1, a second DC power source 3, an interphase transformer 5, and a six-phase motor 6.

The first DC power source 1 is coupled to the first 3-phase voltage-fed inverter 2, and the second DC power source 3 is coupled to the second 3-phase voltage-fed inverter 4.

The first 3-phase voltage-fed inverter 2 and the second 3-phase voltage-fed inverter 4, respectively, are coupled to the first and second input terminal of the interphase transformer 5. Output terminals of the interphase transformer 5 are coupled to respective 3-phase windings of the six-phase motor 6.

The first and second 3-phase voltage-fed inverters 2, 4 take the DC power from the first and second DC power sources 1, 3 and converts it into six-phase, variable frequency AC for the motor 6 and is configured as two three-phase inverters, provided as modules. With modular inverters, one can easily configure two standard modules for six-phase or four standard modules for twelve-phase operation. In the present embodiment, 3% total harmonic distortion (THD) limits are met with six-phase or, in other words, twelve-step operation. Pairs of inverter modules operate with a net 30° phase displacement such that $5^{th}$ and $7^{th}$ voltage harmonic components cancel. The zig-zag interphase transformer 5 is provided to facilitate this cancellation completely. The six-phase motor windings are also phase-displaced in the same manner as the respective inverter bridges. This circuit arrangement facilitates non-pulse width modulation (PWM) operation with relatively slow-switching 6500V insulated gate bipolar transistors (IGBTs) at 99.4% full-speed inverter bridge efficiency and low total harmonic distortion (THD) across a portion of the 2500 to 15000 RPM operating speed range of the motor 6.

The first 3-phase voltage-fed inverter 2, and the second 3-phase voltage-fed inverter 4 operate with a phase displacement of 30 degrees in the output voltage. The primary purpose of the zig-zag interphase transformer 5 is to block the 5th, 7th and all other 6 k+/−1 order, k odd, i.e., $5^{th}$, $7^{th}$, $19^{th}$, $21^{st}$, $33^{rd}$, $35^{th}$, . . . , harmonic voltages generated by the first 3-phase voltage-fed inverter 2 and the second 3-phase voltage-fed inverter 4 from the motor 6.

Referring to FIG. 3, a schematic diagram is shown of the multi-level high-speed adjustable speed drive of FIG. 2.

Shown is a first multilevel, 3-phase voltage-fed inverter 2 and a second multilevel 3-phase voltage-fed inverter 4, a first DC power source(s) 1, a second DC power source 3, an interphase transformer 5, and a six-phase motor 6.

The first DC power source 1 is coupled to the first 3-phase voltage-fed inverter 2, and the second DC power source 3 is coupled to the second 3-phase voltage-fed inverter 4. The DC power sources 1,3 may be coupled in parallel or be independent depending on the circumstances of the power source, as indicated by the dashed lines 7.

The first 3-phase voltage-fed inverter 2 and the second 3-phase voltage-fed inverter 4, respectively, are coupled to first and second input terminal sets of first and second separate circuits of the interphase transformer 5. Output terminals of the interphase transformer 5 are coupled to respective 3-phase windings of the six-phase motor 6. Each 3-phase winding is phase displaced by 30 degrees relative to adjacent ones of the 3-phase windings. Such phase displacement in the motor is achieved, for example, by putting each 3-phase winding in half of a multiplicity of slots of a motor stator, and the other winding in the remaining slots. If a 4-pole, 6-phase motor has 48 slots, then 24 of the slots are for phases ABC and the other 24 are for DEF and there are two coils per phase, per pole.

The first 3-phase voltage-fed inverter 2, and the second 3-phase voltage-fed inverter 4 operate with a phase displacement of 30 degrees in the output voltage. The primary purpose of the zig-zag interphase transformer 5 is to block the 5th, 7th and all other 6 k+/−1 order, k odd, i.e., $5^{th}$, $7^{th}$, $19^{th}$, $21^{st}$, $33^{rd}$, $35^{th}$, . . . , harmonic voltages generated by the first 3-phase voltage-fed inverter 2 and the second 3-phase voltage-fed inverter 4 from the motor 6.

The present adjustable speed drive is illustrated with a three-level, 2×3 phase topology, has a 8 MW maximum power rating, has a maximum frequency of 750 Hz, and a maximum voltage of 4,600 VAC. This embodiment can be employed industrially for applications ranging from 100 kW, 150,000 RPM at 500 VAC up to 50 MW, 5000 RPM at 13,800 VAC. In general, for industrial applications, speed tends to be inversely proportional to power level and physical size. Small motors cannot operate at high voltage due to slot size limitations and thickness of insulation. Larger motors cannot operate at low voltages due to the physical size of the connections between the motor and inverter. Such power and voltage levels are an example of what is easily achieved with commercially available Silicon IGBTs. Higher or lower voltage ratings may be achieved by series device operation or higher current ratings can be achieved by parallel device or module operation. Similar benefits can be achieved if three-phase inverter bridges with more than 3 levels are employed.

Referring next to FIG. 4, a graph is shown of line-to-line voltage over the angular equivalent a fundamental cycle in 0 to 360 degrees showing line-to-line voltage under a rated operating condition as generated by the multi-level high-speed adjustable speed drive of FIG. 2.

Referring next to FIG. 5, a schematic diagram is shown of a zig-zag configuration of an interphase transformer of the multi-level high-speed adjustable speed drive of FIG. 2.

As shown in the schematic diagram of FIG. 5, the zig-zag configuration of the interphase transformer has 3 core legs and each leg has three windings. One notes that terminal A is connected to a 15 turn coil on the middle leg and that coil is connected in series with an oppositely wound 15 turn coil on the top leg. The oppositely wound 15 turn coil of that leg is connected to terminal A'. Since this first 15 turn coil is on the leg with the phase E 15 turn coil, the voltage is in opposite phase with the phase E 15 turn coil, as illustrated by the black dots on the coil symbol.

Terminal B is connected to a 15 turn coil on the bottom leg and that coil is connected in series with an oppositely wound 15 turn coil on the middle leg. The oppositely wound 15 turn coil of that leg is connected to terminal B'. Since this first 15 turn coil is on the leg with the phase F coil, the voltage is in opposite phase with the phase F winding, as illustrated by the black dots on the coil symbol.

Terminal C is connected to a 15 turn coil on the top leg and that coil is connected in series with an oppositely wound 15 turn coil on the bottom leg. The oppositely wound 15 turn coil of that leg is connected to terminal C'. Since this first 15 turn coil is on the leg with the phase D coil, the voltage is in opposite phase with the phase D winding, as illustrated by the black dots on the coil symbol.

The above arrangement is an example of coil turns ratio of 26/15=1.7333; any turns ratio closely approximating 1.7321 can be shown to be satisfactory.

FIG. 6 is a vector diagram illustrating balanced fundamental frequency currents from each inverter of the multi-level high-voltage adjustable speed drive of FIG. 2.

As shown in the vector diagram of FIG. 6, with balanced voltages and assumed currents as described above from each inverter, i.e. phase D lags phase A by 30 degrees, the net ampere-turns on the first leg from Phase D cancels that of phase A and phase B.

Also, phase E cancels phase B and phase C; phase F cancels phase A and Phase C. Since these magnetomotive forces (MMFs) at fundamental frequency cancel out, the fundamental voltage is essentially zero. A turns ratio of 26/15=1.73333 matches the square root of three within 0.09%. Thus, with the six-phase inverter and a six-phase motor, the voltage drop in the interphase transformer at fundamental frequency is essentially zero.

As stated above, the primary purpose of the harmonic blocker is to cancel a series of harmonic voltages starting with the 5th and 7th, which can be the predominant cause of harmonic losses in an inverter-driven motor. The 5th or 7th harmonic voltages from the inverter, given the 30° phase displacement at fundamental frequency between the two 3-phase groups, will have a phase displacement of 5×30=150° and 7×30=210° for the 5th and 7th harmonics and the phase sequence will be negative and positive, respectively.

Referring to FIGS. 7 and 8, phasor diagrams are shown illustrating 5th and 7th harmonic voltages and phase sequences, positive and negative, respectively, generated by a harmonic blocker of the multi-level high-voltage adjustable speed drive of FIG. 2.

This same phase relationship applies to all "k odd" harmonics. FIGS. 7 and 8 show the phasor diagrams associated with these harmonic voltages. Note that with the 15/26 turns ratio between the DEF coils and the individual ABC coils, a phase relationship between the voltages in the two sets of coils is identical with that of the harmonic voltages generated by the inverter. Thus the impedance to 5th and 7th harmonics is the high magnetizing impedance of the transformer core and, as a consequence, the harmonic currents to the motor are blocked. This device is referred to as a "harmonic blocker."

For the case of all harmonics of order 6 k+/−1, where k is even, the zig-zag interphase transformer has the same effect as for the fundamental, the case where k=0, and 6 k+/−1=+/−1. So while the 5th and 7th are completely eliminated, 11th, $13^{th}$, $23^{rd}$, $25^{th}$, . . . are passed through to the motor.

Referring to FIG. 9, a graph is shown of motor line-to-line voltages over one fundamental cycle, after the harmonic blocker with the voltage of FIGS. 7 and 8 is applied from an inverter of the multi-level high-voltage adjustable speed drive of FIG. 2.

Note that the waveform is more sinusoidal, indicative of the removal of the "k odd" harmonics, of which the $5^{th}$ and $7^{th}$ are the largest components.

Thus, the harmonic blocker eliminates harmonic voltages with amplitudes of up to $\frac{1}{5}^{th}$ and $\frac{1}{7}^{th}$ the amplitude of the fundamental. A typical six-phase motor will have mutual coupling between the adjacent phases on the order of 25% of the synchronous reactance. The foregoing discussion presents impedances in per-unit quantities with 1.0 pu representing rated voltage per phase/rated current per phase. If, for example, the synchronous reactances, $X_d$, $X_q$, of the motor are 0.5 pu, then the worst-case amplitude of the $5^{th}$ and $7^{th}$ harmonics would be:

$$I_n \approx V_n/(nX)$$

where:
$V_n$=inverter harmonic voltage=1.0 pu/n
$I_n$=pu amplitude of the nth harmonic X=reactance
=assume 0.5 pu for synchronous reactance and all components with k even, i.e. $1^{st}$, $11^{th}$, $13^{th}$, $23^{rd}$, $25^{th}$, ...
=assume 0.35 pu for $5^{th}$, $7^{th}$, $19^{th}$, $21^{st}$,
for some of the harmonics, the pu amplitudes are:

| Order | $V_n$ | $I_n$ |
|---|---|---|
| 5 | 0.2 | 11% |
| 7 | 0.14 | 5.8% |
| 11 | 0.091 | 1.7% |
| 13 | 0.076 | 1.2% |
| RMS THD of all k odd and even components, no harmonic blocking | N/A | 12.9% |
| RMS THD of all components with harmonic blocker | N/A | 2.11% |

In the above estimate, the harmonic blocker eliminates 84% of all harmonic current distortion. In the case of most form-wound motor windings, the conductors of each coil are composed of a stack of insulated parallel strands. Due to the magnetic field cutting perpendicular to the stack of insulated parallel strands, induced voltage will cause additional parasitic losses. The reduction of harmonic currents in the proportions described above will reduce this portion of losses by the square of the total harmonic distortion or about 97%. Losses due to proximity and skin effect, increasing with harmonic frequency, will be reduced by an even greater amount. In one embodiment of the present invention, for the fundamental frequency and all harmonics of order 6 k+/−1, where k is even, the resulting impedance is below 0.1 pu and for all harmonics of order 6 k+/−1, where k is odd, the resulting impedance is above 10 pu. In another embodiment of the present invention, for the fundamental frequency and all harmonics of order 6 k+/−1, where k is even, the resulting impedance is below 0.1 pu and for all harmonics of order 6 k+/−1, where k is odd, the resulting impedance is 20 pu or greater.

An additional advantage of the present embodiment is that the electromechanical (EM) torque ripple occurs at the $12^{th}$ harmonic of the fundamental. In the case of a 4-pole, 15,000 RPM motor, this means that the electromagnetic vibratory torque imparted to the rotor is of $24^{th}$ order or about 6 kHz, well above the $1^{st}$ critical frequency of the shaft coupling between the motor and the load. In one system example, the electromagnetic torque ripple is 2% and torsional analysis shows that the coupling torque ripple is on the order of 0.18%, well below the typical specification of 1% typically required by industry.

Centrifugal compressors will benefit greatly from the application of high-speed motors powered by the adjustable speed drive of the present embodiment. Switching device and system technology originally developed for low-speed, low-frequency motors has some inherent roadblocks when it is applied to high-speed, high-power motors. The inverter adjustable speed drive and motor system overcomes those roadblocks in high speed applications. The described system and method of magnetic coupling eliminates the presence of a high level of $5^{th}$ and $7^{th}$ harmonic distortion in the stator current and associated losses.

Referring to FIG. 10, a schematic diagram is shown of an alternative embodiment of the interphase transformer FIG. 5.

The electromagnetic means shown in FIG. 10 comprises the magnetic core with 3 legs, with each leg having four windings. The electromagnetic means is linked such that a phase A has two series-connected turns, N1 and N2, linking a core leg 1 and a core leg 2, respectively, in opposite orientation, a phase B has two additional connected turns linking a core leg 3 and the core leg 2 in opposite orientation, and a phase C has two further connected turns linking the core leg 3 and the core leg 1 in opposite orientation, wherein the turns ratio for the turns is within +/−1% of N1/N2=0.2680. Additionally, the magnetic core is linked such that a phase D has two added series-connected turns, N3 and N4, linking said core leg 3 and said core leg 1, respectively, in opposite orientation, a phase E links has two further added series-connected turns linking said core leg 1 and said core leg 2, respectively, in opposite orientation and a phase F has two additional added series-connected turns linking said core leg 2 and said core leg 3, respectively, in opposite orientation, wherein another turns ratio for the turns is within +/−1% of N3/N4=0.2680.

Referring to FIG. 11, a schematic diagram is shown of a further alternative embodiment of the interphase transformer of FIG. 5.

The electromagnetic means has 3 separate interphase transformers, 8, 9, 10 .... Phase A is linked with phase D on one core, B with E on another and C with F on yet another, each pair being in opposite orientation as shown by the dots. The electromagnetic means provides 180° phase shift and, as a consequence, provides a net phase shift of 210° and 150° at 6 k+/−1, k odd harmonics, respectively, and, as a result, a compromised degree of harmonic cancellation.

Referring to FIG. 12, a schematic diagram is shown of a nine-phase embodiment of the interphase transformer of FIG. 5.

a) The q phase groups are displaced such that phases A, B, C each lead phases D, E, F, respectively by 20° and phases G, H, I each lag phases D, E, F by 20°, respectively. Within each group of three phases, the phase displacement is 120°.

b) Said electromagnetic means consists of three 3-leg cores as shown. The arrangement of windings produces turns ratios:

$$N1=N3\times\sin(40°)/\sin(120°)$$

$$N2=N3\times\sin(20°)/\sin(120°)$$

Such that the fundamental magnetizing amp-turn components of Phases A, D and G combined with the amp-turns of phases C and H, respectively, produce equal MMFs on each leg. Since the flux return path is in air, there is minimal magnetization of the core. Also, it can be shown that the magnetizing components on each leg due to the above phases at the $5^{th}$, $7^{th}$, $11^{th}$ and $13^{th}$ harmonics are phase displaced by +/−120° as is normal for a three-phase core. As a result, the core is magnetized by these harmonic frequencies and the resulting induction blocks harmonic voltages produced by the inverter from the motor in the same manner as shown for the 2 q=6 phase inverter system, above.

Referring first to FIG. 13, a block diagram is shown of a multi-level high-speed (>3600 RPM) adjustable speed drive in accordance with a further embodiment of the invention.

Shown is a first multilevel, 3-phase voltage-fed inverter 1302 and a second multilevel 3-phase voltage-fed inverter 1304, a third multilevel, 3-phase voltage-fed inverter 1306, and fourth 3-phase multilevel, 3-phase voltage-fed inverter 1308. Also shown is a first DC power source 1310, a second DC power source 1312, a third DC power source 1314, a fourth DC power source 1316, a first interphase transformer 1318, a second interphase transformer 1320, and a twelve-phase motor 1322.

The first DC power source 1310 is coupled to the first 3-phase voltage-fed inverter 1302, the second DC power source 1312 is coupled to the second 3-phase voltage-fed inverter 1304, the third DC power source 1314 us coupled to the third 3-phase voltage-fed inverter 1306, and the fourth DC power source 1316 is coupled to the fourth 3-phase multilevel, 3-phase voltage-fed inverter 1308.

The first 3-phase voltage-fed inverter 1302 and the second 3-phase voltage-fed inverter 1304, respectively, are coupled to the first and second input terminal of the first interphase transformer 1318. The third 3-phase voltage-fed inverter 1306 and the fourth 3-phase voltage-fed inverter 1308, respectively, are coupled to the first and second input terminal of the second interphase transformer 1320. Output terminals of the first interphase transformer 1318 and the second interphase transformer 1320 are coupled to respective 3-phase windings of the twelve-phase motor 1322.

The above descriptions of FIGS. 1-12 represent embodiments with q=2, 3 and 4. It should be noted that for even values of q (2, 4, 6, . . . ) that the above electromagnetic means can be employed to block the "k odd" series of harmonics in the manner described above. As described above, one can use four inverters to realize a twelve-phase system. In such case the phase displacement between three-phase groups in the motor and inverter is 15 degrees. With the arrangement shown in the block diagram of FIG. 13, one electromagnetic means or "harmonic blocker" is connected to two three-phase groups 30 degrees apart and a second is connected to two three-phase inverters displaced 15 degrees from the other group. The $5^{th}$ and 7th harmonics in the motor current will be cancelled. However, $11^{th}$ and $13^{th}$ harmonics are not cancelled but they are attenuated by the motor leakage reactance to a minimal level. Since these harmonics will be cancelled in the motor stator, the effects of these harmonics on torque ripple and rotor heating are eliminated. It can be shown that for any even value of q (2, 4, 6, 8, 10 . . . ) cancellation of all harmonics, except those of order 6 qn-1 and 6 qn+1, where n=any integer, will occur in the stator. For example, if q=6, only $35^{th}$, $37^{th}$, $71^{st}$, $73^{rd}$, . . . harmonics will be present in the air gap and rotor fluxes.

In the case of odd or even values of q, the technique described above for q=3 can be extended by providing each of three separate cores with q legs and providing linked windings with appropriate turns ratios. For example, if q=5, then three 5-legged cores will be required. Again, this approach can be made to work with any value of q and all harmonics, except those of order 6 qn-1 and 6 qn+1, where n=any integer, will be canceled.

While the invention herein disclosed has been described by means of specific embodiments, examples and applications thereof, numerous modifications and variations could be made thereto by those skilled in the art without departing from the scope of the invention set forth in the claims.

What is claimed is:

1. A system comprising:
   a plurality of modular multilevel, 3-phase inverter bridges, wherein the modular multilevel, 3-phase inverter bridges operate with fundamental frequency, f, wherein the modular multilevel, 3-phase inverter bridges include at least three levels, wherein the modular multilevel, 3-phase inverter bridges operate in one of Pulse-Width Modulation (PWM) mode with 9 to 21× the fundamental frequency and operating in Fundamental Frequency Mode (FFM), wherein inverter commutation frequency equals the fundamental frequency, wherein the modular multilevel, 3-phase inverters operate with split phase such that one group is displaced from the other by an angle θ, wherein θ=60°/q, wherein q is a number of 3-phase groups, and wherein when n is a number of harmonic order, phase displacement of a harmonic component of order n between groups, $θ_n$ is nθ/q;
   a high-speed polyphase motor with phases arranged in q 3-phase groups, wherein the motor includes q×3 number of windings; and
   electromagnetic means for blocking selected groups of harmonics while passing components at fundamental frequency, f, wherein the electromagnetic means includes coils carrying motor current linked by a magnetic core wherein the electromagnetic means is interposed between the plurality of modular multilevel, 3-phase inverter bridges and the high-speed polyphase motor such that each input terminal of the electromagnetic means is coupled to one output of the plurality of modular multilevel 3-phase inverter bridges, and each output terminal of the electromagnetic means is directly coupled to one winding of the high-speed polyphase motor, wherein a number of electromagnetic means output terminals is equal to a number of electromagnetic means input terminals.

2. The system of claim 1 comprising:
   said plurality of modular multilevel, 3-phase inverter bridges, wherein said plurality of modular multilevel, 3-phase inverter bridges comprises:
   a first modular multilevel, 3-phase inverter bridge;
   a second modular multilevel, 3-phase bridge;
   a third modular multilevel, 3-phase inverter bridge; and
   a fourth modular multilevel, 3-phase bridge.

3. The system of claim 1 comprising:
   wherein the electromagnetic means includes turns carrying motor current linked by a magnetic core, wherein the magnetic core comprises at least three legs.

4. The system of claim 3 comprising:
   wherein the electromagnetic means includes turns carrying motor current linked by a magnetic core, wherein the magnetic core comprises at least three legs, wherein a first series combination of a first of the turns and a second of the turns is on a first of the legs, wherein the first of the turns is oppositely oriented from the second of the turns, wherein a second series combination of a third of the turns and a fourth of the turns is on a second of the legs, wherein the third of the turns is oppositely oriented from the fourth of the turns, wherein a series combination of a fifth of the turns and a sixth of the turns is on a third of the legs, wherein the third of the turns is oppositely oriented from the second of the turns.

5. The system of claim 1 comprising:
   wherein said electromagnetic means includes a first interphase transformer.

6. The system of claim 5 comprising:
   wherein said electromagnetic means includes a second interphase transformer.

7. The system of claim 6 comprising:
   said first interphase transformer is interposed between a first and second of the plurality of modular multilevel, 3-phase inverter bridges and the high-speed polyphase motor; and said second interphase transformer is interposed between a third and fourth of the plurality of modular multilevel, 3-phase inverter bridges and the high-speed polyphase motor.

8. A system comprising:

a plurality of modular multilevel, 3-phase inverter bridges, wherein the modular multilevel, 3-phase inverter bridges operate with fundamental frequency, f, wherein the modular multilevel, 3-phase inverter bridges include at least three levels, wherein the modular multilevel, 3-phase inverter bridges operate in one of Pulse-Width Modulation (PWM) mode with 9 to 21× the fundamental frequency and operating in Fundamental Frequency Mode (FFM), wherein inverter commutation frequency equals the fundamental frequency, wherein the modular multilevel, 3-phase inverters operate with split phase such that one group is displaced from the other by an angle $\theta$, wherein $\theta = 60°/q$, wherein q is a number of 3-phase groups, and wherein when n is a number of harmonic order, phase displacement of a harmonic component of order n between groups, $\theta_n$ is $n\theta/q$;

a high-speed polyphase motor with phases arranged in q 3-phase groups; and electromagnetic means for blocking selected groups of harmonics while passing components at fundamental frequency, f, wherein the electromagnetic means includes coils carrying motor current linked by a magnetic core, wherein the electromagnetic means is interposed between the plurality of modular multilevel, 3-phase inverter bridges and the high-speed polyphase motor, whereby said electromagnetic means presents a minimal first impedance to currents at fundamental frequency, f, and to all frequency components at f=6 k+/−1, for k even, and presents a large second impedance to all frequency components at f=6 k+/−1, for k odd.

9. The system of claim 8 further comprising:

wherein said electromagnetic means comprises a plurality of coils coupled by the magnetic core, wherein the magnetic core comprises 3 legs, wherein an A phase comprises a series combination of a first of the plurality of coils and a second of the plurality of coils, wherein the first of the plurality of coils is on a second of the legs, and the second of the plurality of coils is on a first of the legs, wherein the first of the plurality of coils is oppositely oriented from the second of the plurality of coils, wherein a B phase comprises a series combination of a third of the plurality of coils and a fourth of the plurality of coils, wherein the third of the plurality of coils is on a third of the legs, and the fourth of the plurality of coils is on the second of the legs, wherein the third of the plurality of coils is oppositely oriented from the fourth of the plurality of coils, wherein a C phase comprises a series combination of a fifth of the plurality of coils and a sixth of the plurality of coils, wherein the fifth of the plurality of coils is on the first of the legs, and the sixth of the plurality of coils is on the third of the legs, wherein the fifth of the plurality of coils is oppositely oriented from the sixth of the plurality of coils, wherein a D phase comprises a seventh of the plurality of coils, wherein the seventh of the plurality of coils is on the first of the legs, wherein an E phase comprises an eighth of the plurality of coils, wherein the eighth of the plurality of coils is on the second of the legs, wherein an F phase comprises a ninth of the plurality of coils, wherein the ninth of the plurality of coils is on the third of the legs.

10. The system of claim 9 further comprising:

wherein the first, third and fifth coils each have a number of turns N1, and the second, fourth, and sixth coils each have a number of turns N2.

11. The system of claim 10 further comprising:

wherein phase D further comprises a tenth of the plurality of coils on the third of the legs, wherein the tenth coil is connected before the seventh coil in series and the tenth coil is oppositely oriented from the seventh coil, wherein phase E further comprises an eleventh of the plurality of coils on the first of the legs, wherein the eleventh coil is connected before the eighth coil in series and the eleventh coil is oppositely oriented from the eighth coil, wherein phase F further comprises a twelfth of the plurality of coils on the second of the legs, wherein the twelfth coil is connected before the ninth coil in series and the eleventh coil is oppositely oriented from the eighth coil, wherein the seventh, eighth, and ninth coils each have the number of turns N2, and the tenth, eleventh, and twelfth coils each have the number of turns N1.

12. The system of claim 8 further comprising:

said electromagnetic means arranged in three 3-phase groups: a first group comprising phases A, B, and C, a second group comprising phases D, E, and F, and a third group comprising phase G, H, and I, wherein the three 3-phase groups are displaced such that phases A, B, C each lead phases D, E, F by 20°, respectively, and phases G, H, I each lag phases D, E, F by 20°, respectively, wherein, within phases A, B, C, phase displacement is 120°, wherein, within phases D, E, F, phase displacement is 120°, and within phases G, H, I, phase displacement is 120°.

13. The system of claim 12 further comprising:

wherein said electromagnetic means comprises three, 3-leg cores, wherein the A, B, C, G, H, and I phases comprise a first coil on one leg and a second coil in series on another leg, wherein the first coil has a number of turns N1 and the second coil has a number of turns N2, and wherein the D, E, and F phases comprise a single coil on one leg with a number of turns N3, wherein an arrangement of coils produces turns ratios:

$$N1 = N3 \times \sin(40°)/\sin(120°)$$

$$N2 = N3 \times \sin(20°)/\sin(120°)$$

such that fundamental magnetizing amp-turn components of phases A, D and G combined with the amp-turn components of phases C and H, respectively, produce equal magnetomotive force (MMFs) on each leg, wherein magnetizing components on each leg due to the above phases at the $5^{th}$, $7^{th}$, $11^{th}$ and $13^{th}$ harmonics are phase displaced by +/−120 degrees, wherein the core is magnetized by $5^{th}$, $7^{th}$, $11^{th}$ and $13^{th}$ harmonics frequencies and the resulting induction blocks harmonic voltages produced by the plurality of modular multilevel, 3-phase inverter bridges from the high-speed polyphase motor.

14. A system comprising:
a plurality of modular multilevel, 3-phase inverter bridges, wherein the modular multilevel, 3-phase inverter bridges operate with fundamental frequency, f, wherein the modular multilevel, 3-phase inverter bridges include at least three levels, wherein the modular multilevel, 3-phase inverter bridges operate in one of Pulse-Width Modulation (PWM) mode with 9 to 21× the fundamental frequency and operating in Fundamental Frequency Mode (FFM), wherein inverter commutation frequency equals the fundamental frequency, wherein the modular multilevel, 3-phase inverters operate with split phase such that one group is displaced from the other by an angle $\theta$, wherein $\theta=60°/q$, wherein q is a number of 3-phase groups, and wherein when n is a number of harmonic order, phase displacement of a harmonic component of order n between groups, $\theta_n$ is $n\theta/q$;
a high-speed polyphase motor with phases arranged in q 3-phase groups; and
electromagnetic means for blocking selected groups of harmonics while passing components at fundamental frequency, f, wherein the electromagnetic means includes coils carrying motor current linked by a magnetic core, wherein the electromagnetic means is interposed between the plurality of modular multilevel, 3-phase inverter bridges and the high-speed polyphase motor, wherein said electromagnetic means has a turns ratio that matches the square root of 3 within 0.09%.

15. The system of claim 14 further comprising:
wherein said electromagnetic means has a turns ratio of 1.7333.

16. A system comprising:
a plurality of modular multilevel, 3-phase inverter bridges, wherein the modular multilevel, 3-phase inverter bridges operate with fundamental frequency, f, wherein the modular multilevel, 3-phase inverter bridges include at least three levels, wherein the modular multilevel, 3-phase inverter bridges operate in one of Pulse-Width Modulation (PWM) mode with 9 to 21× the fundamental frequency and operating in Fundamental Frequency Mode (FFM), wherein inverter commutation frequency equals the fundamental frequency, wherein the modular multilevel, 3-phase inverters operate with split phase such that one group is displaced from the other by an angle $\theta$, wherein $\theta=60°/q$, wherein q is a number of 3-phase groups, and wherein when n is a number of harmonic order, phase displacement of a harmonic component of order n between groups, $\theta_n$ is $n\theta/q$;
a high-speed polyphase motor with phases arranged in q 3-phase groups; and
electromagnetic means for blocking selected groups of harmonics while passing components at fundamental frequency, f, wherein the electromagnetic means includes coils carrying motor current linked by a magnetic core, wherein the electromagnetic means is interposed between the plurality of modular multilevel, 3-phase inverter bridges and the high-speed polyphase motor,
wherein said electromagnetic means comprises turns coupled by said magnetic core, wherein said electromagnetic means further comprises other turns coupled by another magnetic core, and further turns coupled by a further magnetic core, and a phase A is linked with a phase D on said core, a phase B is linked with a phase E on the other magnetic core, and a phase C is linked with a phase F on the further magnetic core, the phase A and the phase D being in opposite orientation, the phase B and the phase E being in opposite orientation, and the phase C and the phase F being in opposite orientation,
wherein said electromagnetic means provides 180° phase shift and, as a consequence, provides a net phase shift of 210° and 150° at 6 k+/−1, k odd harmonics, respectively, and, as a result, a compromised degree of harmonic cancellation.

17. A system comprising:
a plurality of modular multilevel, 3-phase inverter bridges, wherein the modular multilevel, 3-phase inverter bridges operate with fundamental frequency, f, wherein the modular multilevel, 3-phase inverter bridges include at least three levels, wherein the modular multilevel, 3-phase inverter bridges operate in one of Pulse-Width Modulation (PWM) mode with 9 to 21× the fundamental frequency and operating in Fundamental Frequency Mode (FFM), wherein inverter commutation frequency equals the fundamental frequency, wherein the modular multilevel, 3-phase inverters operate with split phase such that one group is displaced from the other by an angle $\theta$, wherein $\theta=60°/q$, wherein q is a number of 3-phase groups, and wherein when n is a number of harmonic order, phase displacement of a harmonic component of order n between groups, $\theta_n$ is $n\theta/q$;
a high-speed polyphase motor with phases arranged in q 3-phase groups; and
electromagnetic means for blocking selected groups of harmonics while passing components at fundamental frequency, f, wherein the electromagnetic means includes coils carrying motor current linked by a magnetic core, wherein the electromagnetic means is interposed between the plurality of modular multilevel, 3-phase inverter bridges and the high-speed polyphase motor, wherein the electromagnetic means includes turns carrying motor current linked by a magnetic core, wherein the magnetic core comprises at least nine legs.

* * * * *

UNITED STATES PATENT AND TRADEMARK OFFICE
CERTIFICATE OF CORRECTION

PATENT NO. : 10,727,774 B2
APPLICATION NO. : 15/067448
DATED : July 28, 2020
INVENTOR(S) : Santamaria Page 1 of 1

It is certified that error appears in the above-identified patent and that said Letters Patent is hereby corrected as shown below:

In the Claims
Claim 4, Column 10, Line 53, delete "wherein the third" and insert --wherein the fifth--.
Claim 4, Column 10, Line 54, delete "second" and insert --sixth--.

Signed and Sealed this
Fifteenth Day of September, 2020

Andrei Iancu
*Director of the United States Patent and Trademark Office*